United States Patent [19]

Piana

[11] Patent Number: 5,739,266
[45] Date of Patent: Apr. 14, 1998

[54] PROCESS FOR MODIFYING A POLYETHYLENE IN AN EXTRUDER

[75] Inventor: Alain Piana, Martigues, France

[73] Assignee: BP Chemicals Limited, London, England

[21] Appl. No.: 515,830

[22] Filed: Aug. 16, 1995

[30] Foreign Application Priority Data

Aug. 30, 1995 [FR] France ................................. 94 10630

[51] Int. Cl.⁶ ............................................ C08F 2/02
[52] U.S. Cl. ..................... 528/483; 528/487; 528/490; 528/502 C
[58] Field of Search ................... 528/483, 487, 528/490, 502 C

[56] References Cited

U.S. PATENT DOCUMENTS

| | | | |
|---|---|---|---|
| 3,551,943 | 1/1971 | Staton | 528/481 |
| 3,563,972 | 2/1971 | Kowalski | 528/481 |
| 3,608,001 | 9/1971 | Kowalski et al. | 264/40 |
| 3,898,209 | 8/1975 | Watson et al. | 260/93.7 |
| 4,029,877 | 6/1977 | Yoshiura et al. | 5218/483 |
| 4,820,463 | 4/1989 | Raufast | 528/483 |

FOREIGN PATENT DOCUMENTS

| | | |
|---|---|---|
| 0121740 | 10/1984 | European Pat. Off. . |
| 0219789 | 3/1985 | Germany . |

*Primary Examiner*—Thomas R. Weber
*Attorney, Agent, or Firm*—Brooks Haidt Haffner & Delahunty

[57] ABSTRACT

The present invention relates to a process for modifying a polyethylene in an extruder by bringing the polyethylene into contact with oxygen or a gas mixture containing oxygen in the extruder, optionally in the presence of a relatively small quantity or preferably in the absence of short-term antioxidant agent. The polyethylene is then treated thermomechanically in the molten state in the extruder supplying a relatively high specific mechanical energy, the thermomechanical treatment is completed when the value of the loss tangent of the polyethylene characterizing its viscoelastic state decreases in a desired proportion. The polymer thus treated is particularly suitable for being transformed by blown extrusion into a film having a considerably increased bubble stability.

21 Claims, No Drawings

PROCESS FOR MODIFYING A POLYETHYLENE IN AN EXTRUDER

BACKGROUND OF THE INVENTION

(1) Field of the Invention

The present invention relates to a process for modifying a polyethylene in an extruder with a view to improving the properties of the polyethylene, especially when it is being converted into film.

(2) Description of the Prior Art

Some polyethylenes can be converted into film according to the blown extrusion or blown film technique as described, for example, by J. P. Trotignon, J. Verdu, M. Piperaud and A. Dobraczynski in the "Précis de Matières Plastiques—Structures—propriétés, mise en oeuvre et normalisation" ["Summary of Plastics—Structures—properties, processing and standardization"] 5th edition (1993) published by Afnor and Nathan (Paris-La-Défense—France) pages 122 to 125. The technique of film production by blown extrusion consists in extruding, with the aid of an annular die, a thin sleeve which, temporarily nipped, is inflated by means of an air overpressure and drawn with the aid of haul-off rolls or nip rolls until it reaches the required thickness, for example from 10 to 250 μm. The bubble thus formed is cooled by a circulation of air which stops the drawing of the film. This phenomenon is caused by the solidification of the cooled material which then withstands the stresses due to the inflation. The film in bubble form is then flattened by a device consisting of two panels which converge towards the nip rolls.

After reeling, the product obtained will be capable of being employed in the form of sleeve or film if the sleeve is slit on a generatrix. Blown extrusion now enables the greatest film widths to be obtained. Annular dies which are up to 1.8 m in diameter are actually successfully employed at the present time, and this makes it possible to manufacture sleeves from 5 to 6 m in diameter which, when slit, yield films capable of reaching 20 m in width.

Furthermore, it is desired to obtain a maximum flow rate of film which has optimum properties which are often subtly dependent on the entire history with regard to stress, deformation rate and temperature to which the elements of material are subjected when following their path especially in the region of biaxial drawing of the bubble.

It has been noted that some linear high- or low-density polyethylenes do not have a macromolecular structure which is sufficiently adapted to enable them to be converted into film directly by blown extrusion, and they can especially result in bubble instability problems. In this case, to correct the fault, it is necessary to modify the extruder setting and, quite often, to reduce the extruder throughput. It is known, furthermore, that films manufactured under bubble instability conditions have a nonuniform thickness and consequently mediocre mechanical and optical properties.

European Patent Application n° 0 121 740 discloses a process for improving surface appearance of a polyethylene transformed by blow molding into molded product (e.g. bottles). Although the process comprises pelletizing polyethylene in the presence of air or oxygen in an extruder, the European Patent Application is not concerned with a process for converting a polyethylene into film by blown extrusion. Furthermore, it gives no information relating to a specific mechanical energy of the extruder and to the values of the loss tangent of the polyethylene before and after the process, characterizing a particular viscoelastic property of the polyethylene in the molten state.

SUMMARY OF THE INVENTION

A process for thermomechanical treatment of a polyethylene melt in an extruder has now been found, combining a preliminary bringing the polymer into contact with oxygen before it melts and a thermomechanical treatment of the melting polymer in the extruder supplying a relatively high specific mechanical energy so as to modify to a desired degree a characteristic parameter of the viscoelastic state of the polymer. The process thus makes it possible to adjust certain viscoelastic properties of the polymer, especially by a partial and specific crosslinking by virtue of oxygen or air under particular mechanical stress conditions, by creating some long branching and/or some transverse bonds between macromolecular chains in the macromolecular network. The process thus makes it possible to form a polymer with improved viscoelastic properties which are compatible with good conditions of conversion into film by blown extrusion, especially with a considerably increased bubble stability.

DETAILED DESCRIPTION OF THE INVENTION

More particularly, the present invention relates to a process for improving the bubble stability of a linear polyethylene converted into film by blown extrusion, the polyethylene having a density of 0.900 to 0.970, preferably from 0.932 to 0.965 g/cm$^3$, a molecular mass distribution such that the ratio of the weight-average molecular mass, Mw, to that based on the number-average, Mn, is from 8 to 40, preferably from 9 to 30, and a value of the loss tangent measured by dynamic rheometry at 190° C. at a frequency of $1.5 \cdot 10^{-2}$ radians per second, ranging from 1.5 to 3, preferably from 1.6 to 2.5, the process being characterized in that, before its complete melting in an extruder, the polyethylene is brought into contact with oxygen or a gas mixture containing oxygen, and the polyethylene thus brought into contact is treated thermomechanically in the molten state in the extruder supplying a specific mechanical energy of 0.15 to 0.5, preferably from 0.17 to 0.35 kWh per kilogram of polyethylene, the preliminary bringing into contact and the thermomechanical treatment being combined so that the treatment is conducted to its completion when the value of the loss tangent of the polyethylene has lost from 15 to 70%, preferably from 20 to 65% of its initial value before treatment and bringing into contact.

The process is suitable for a linear polyethylene which has a density of 0.900 to 0.970, preferably from 0.932 to 0.965, in particular from 0.938 to 0.960 g/cm$^3$. The polyethylene may be a homopolyethylene as well as a copolymer of ethylene with at least one alpha-olefin, especially $C_3$–$C_8$, for example propylene, 1-butene, 1-hexene, 4-methyl-1-pentene or 1-octene. The polyethylene may be prepared by a polymerization process in suspension or preferably in gas phase. It may be prepared in the presence of a catalyst containing a transition metal, in particular a catalyst of Ziegler-Natta type, especially based on a titanium, vanadium, chromium or zirconium compound, preferably a halogen compound of these metals, or based on a metallocene compound, especially of the transition metals such as those referred to above, for example a zirconocene, or preferably a catalyst based on chromium oxide thermally activated and optionally modified with titanium, aluminium or fluorine. It is preferred to employ in particular a polyethylene prepared in a gas phase polymerization process, especially in a fluidized bed, with the aid of a catalyst based on chromium oxide activated by a heat treatment and optionally modified with aluminium, titanium or fluorine.

The process is suitable for a linear polyethylene which has a broad or even very broad molecular mass distribution such that the ratio Mw: Mn is from 8 to 40, preferably from 9 to 30, for example from 10 to 25. The molecular mass distribution may be of bimodal type. In this case the polyethylene may be manufactured by a polymerization process including at least two successive stages. A linear polyethylene which has such a broad or very broad molecular mass distribution can also be characterized by a high or even very high ratio of melt indices measured at 190° C. under different loads. Thus, for example, a ratio of melt indices measured under 21.6 kg and 2.16 kg ($MI_{21.6}$: $MI_{2.16}$) may have a value ranging from 115 to 700, preferably from 120 to 400, in particular from 125 to 300, the melt indices $MI_{21.6}$ and $MI_{2.16}$ being measured according to the ASTM standards D-1238, conditions F and E respectively. It is also possible to calculate a ratio of melt indices measured at 190° C. under 21.6 kg and 8.5 kg ($MI_{21.6}$: $MI_{8.5}$), which may take a value ranging from 6.5 to 20, preferably from 7 to 17, in particular from 7.5 to 15.

The polyethylene may have a melt index ($MI_{21.6}$) measured according to ASTM standard D-1238, condition F, ranging from 1 to 30, preferably from 5 to 25, in particular from 7 to 20 g/10 minutes.

Good results have been obtained especially when the polyethylene contains a relatively high number of carbon/carbon double bonds, in particular from 0.05 to 0.2, preferably from 0.06 to 0.15 unsaturations of vinyl, vinylidene and vinylene type per 100 carbon atoms.

The process is suitable for a linear polyethylene which has a particular viscoelastic property in the molten state, defined especially by the loss tangent i.e. the tangent of the angle of mechanical loss (tg δ), also called tangent of phase-shift δ between the stress and the strain. The definition and the method of measurement of the loss tangent (tg δ) are given in:

"Viscoélasticité des polyméres à l'état fondu—Rhéométrie an régime dynamique" ["Viscoelasticity of polymers in the molten state—Rheometry in a dynamic regime"] by J. F. May, published by "Les Techniques de l'Ingénieur" ["The Engineer's Techniques"] (5–1985), "Matériaux non-métalliques" ["Nonmetallic materials"] series, volume AM3, A3617, pages 2 to 10;

"Rheometrics—Comprendre les essais rhéologiques—Thermoplastiques" ["Rheometrics—Understanding the rheological tests—Thermoplastics"] by Rheometrics, published by Omniplan (Saclay, France), pages 10 to 12.

When measured by dynamic rheometry at 190° C. at a frequency of 1.5 $10^{-2}$ radians per second, the value of the loss tangent (tg δ) of the polyethylenes which are suitable in the process of the present invention ranges from 1.5 to 3, preferably from 1.6 to 2.5. It has been found, in fact, that linear polyethylenes which exhibit the bubble instability defect during conversion by blown extrusion and which are capable of having their defect corrected by the process of the invention, have an initial value, before treatment, of the loss tangent (tg δ) which lies in the range described above.

The process consists in treating the polyethylene thermo-mechanically in an extruder under certain specific conditions. The extruder generally comprises one, two or a number of screws and different zones as described on pages 108 to 116 of the "Précis de Matières Plastiques—Structures—propriétés, mise en oeuvre et normalisation" referred to above. In particular, these zones may be, in the direction of the polymer flow in the extruder:

(a) a feed hopper communicating with a feed zone in which the polymer is entirely solid, especially in the form of granules or powder, and is conveyed in the solid, more or less compacted, state, by the screw(s), this zone being also known under the name of solid transport zone, (b) a plasticization- or melting zone in which the solid polymer and the molten polymer coexist, and which coincides with at least one compression zone and optionally at least one decompression zone, and (c) a pumping or melt-conveying zone in which the polymer is completely melted and is conveyed in the molten state, optionally in the presence of blending and shearing means, towards an extrusion head consisting essentially of a die which gives the polymer the desired section form.

The process includes bringing the polyethylene before its complete melting in an extruder, especially as described above, into contact with oxygen or a gas mixture containing oxygen. The gas mixture may contain from 1 to 50%, preferably from 2 to 21%, in particular from 3 to 14% and more especially from 3 to 9% by volume of oxygen e.g. when measured in the gas atmosphere of a feed hopper of the extruder. It is possible especially to employ oxygen in the form of a gas mixture with an essentially inert gas, in particular nitrogen, for example air or an air enriched or preferably depleted in oxygen, especially containing less than 21% and more than 2% by volume of oxygen, preferably from 3 to 9% by volume of oxygen, preferably measured in the gas atmosphere of a feed hopper of the extruder.

The oxygen or the gas mixture containing oxygen is brought into contact with the polyethylene before its complete melting in the extruder. The bringing into contact may thus be produced in any part of the extruder, with the exception of the pumping or melt-conveying zone. In particular, it may be brought about in the plasticization or melting zone of the extruder or else in the feed or solid transport zone of the extruder, or, again, in the feed hopper of the extruder. It is preferred to produce the contact in the feed hopper of the extruder because it is thus possible to obtain a more intimate and homogeneous mixing of the oxygen with the polyethylene before the latter is completely melted. In this case the gas atmosphere of the feed hopper consists of oxygen or of the gas mixture containing oxygen, described above. This can be produced by introducing the polyethylene and the oxygen or the gas mixture containing oxygen together or separately into the feed hopper. It is also possible to introduce the polyethylene into the feed hopper under a particular gas atmosphere, for example air, and to adjust the desired percentage of oxygen in the hopper by introducing into it either an inert gas such as nitrogen, to form, for example, an oxygen-depleted air, or oxygen or an oxygen-rich gas mixture, to form, for example, an oxygen-enriched air. The control of the percentage of oxygen in the gas mixture brought into contact with the polyethylene can be carried out with the aid of an analyser such as a conductometric apparatus or of gas phase chromatography, optionally linked with a stopcock making it possible to increase or to decrease at will and automatically the entry flow rate into the hopper of one of the constituents of the gas mixture, for example an inert gas such as nitrogen. If the contact takes place in the feed hopper, the sensor of the analyser may be situated inside the hopper, preferably in its lower part, near the entry to the extruder's feed zone.

The feed hopper may be a simple hopper in which the polymer flows especially under gravity towards the screw entry zone, that is to say towards the entry to the feed zone of the extruder. The hopper may include a system with a rotary stirrer or a vibration device. It is also possible to employ a feed hopper with a forcing device such as a forcing screw with a deep flight rotating on the axis of the hopper. It is also possible to employ a feed hopper with a metering device such as an auxiliary screw of uniform pitch and flight depth, placed at the bottom of the hopper parallel to the extrusion screw(s), or an oscillating chute or a vibrating chute placed at the bottom of the hopper.

Bringing the polyethylene into contact with the oxygen can be appreciably improved when the polyethylene is employed in the form of a powder consisting of porous particles which may have a bulk density at rest of 0.3 to 0.55, preferably from 0.35 to 0.55 g/cm$^3$, measured under ASTM standard D-1895/89. If a polyethylene in the form of powder consisting of porous particles is employed, the porosity of the polyethylene at ambient temperature (+20° C.) may be characterized by a pore volume ranging from 0.05 to 0.4, preferably 0.1 to 0.2 cm$^3$/g, measured by porosimetry using mercury, and/or by a specific (BET) surface ranging from 0.05 to 1, preferably from 0.1 to 0.5 m$^2$/g. The polyethylene particles may have a mass-average diameter ranging from 300 to 3000 μm, preferably from 500 to 2000 μm, in particular from 600 to 1500 μm.

Good results are obtained, moreover, when the extruder is a pelletizer or an extruder converting the powder into pellets, especially a twin-screw extruder, for example a twin-screw extruder without interpenetration of flights, also known by the name of an extruder with tangent twin screws, or else an extruder with twin screws with interpenetrating flights rotating either in the same direction, that is to say with corotative screws, or in an opposite direction, that is to say with counter-rotative screws. An extruder with corotative twin screws with interpenetrating flights is preferred. In all cases the temperature of the polyethylene at the exit of the extruder, that is to say at the die, may be from 160° to 260° C., preferably from 190° to 250° C., in particular from 230° to 250° C.

The process of the invention additionally includes a thermomechanical treatment of the polyethylene carried out in the molten state in the extruder under conditions such that the extruder supplies to the polyethylene a specific mechanical energy of 0.15 to 0.5, preferably from 0.17 to 0.40, in particular from 0.20 to 0.35 kWh per kilogram of polyethylene. The specific mechanical energy of the extruder can be generally calculated as the quotient of the effective mechanical power (in kW) of the extruder and the throughput of the polymer (in kg/h) in the extruder, it being known that the effective mechanical power of the extruder can be usually calculated using the equation:

$$P_{me} = P_{max} \frac{N}{N_{max}} \frac{I}{I\max}$$

with $P_{me}$=effective mechanical power $P_{max}$=maximum power,

N=number of revolutions of the screw(s) per minute, $N_{max}$=maximum number of revolutions of the screw(s) per minute, I=effective motor current I max=maximum motor current It has been observed that the choice of a specific mechanical energy in an extruder, applied to and combined with the use of a polyethylene of particular viscoelastic property and with a preliminary bringing into contact of the polyethylene with oxygen makes it possible to improve the conditions of conversion of polyethylene into film by blown extrusion especially with a particularly high level of bubble stability. This result is obtained especially after the contact has been produced and the thermomechanical treatment conducted in such a way that at the end of treatment the value of the loss tangent (tg δ) of the polyethylene has lost from 15 to 70%, preferably from 20 to 65%, in particular from 25 to 60% of its initial value before treatment and bringing into contact. Under these conditions the required improvement is obtained while a good compromise is maintained in respect of the mechanical properties of the product obtained.

The process is thus conducted in order to arrive at the end of the operations at a reduction in the value of tg δ of the polyethylene within the abovementioned proportions. In the course of the process an adjustment in the reduction of tg δ can be made by operating by virtue of the means used according to the invention, that is to say the bringing of the polyethylene into contact with oxygen and the use of an extruder with a specific mechanical energy. In particular, the amplitude of the reduction in tg δ generally varies in the same direction as the quantity of oxygen employed when the bringing into contact is produced, especially in the gas mixture containing oxygen, or the specific mechanical energy supplied by the extruder. Thus, if in the process it is desired to increase the amplitude of the reduction in tg δ at the end of treatment within the desired proportions, it is possible, for example, to increase the quantity of oxygen employed when the contact is produced, especially in the gas mixture containing oxygen, or to increase the specific mechanical energy of the extruder especially within the range of the abovementioned values, or else to combine the two means simultaneously. If, on the contrary, it is desired to decrease the amplitude of the reduction in tg δ within the desired proportions, the reverse action may be taken, that is to say to decrease the quantity of oxygen or to decrease the specific mechanical energy of the extruder or else to combine both means.

It has been observed, furthermore, that it is advantageous to carry out the thermomechanical treatment in the presence of a relatively small quantity or even, preferably, in the absence of a stabilizing agent of antioxidant type, generally known by the name of "process antioxidant agent" or "short-term antioxidant agent", such as a phosphite or phosphonite. It is thus preferred that, before its complete melting, the polyethylene is brought into contact in the extruder with a relatively small quantity of short-term antioxidant agent, for example in a quantity ranging from 0 to 1000, preferably from 0 to 800 or from 0 to 500, in particular from 0 to 200 parts by weight per million (ppm) relative to the polyethylene. In the case where a relatively small proportion is employed, the short-term antioxidant agent may be introduced into the feed or melting zone of the extruder, or preferably into the feed hopper of the extruder. The process which is conducted in order to arrive at the end of operations at a reduction in tg δ of the polyethylene in the proportions described above may especially comprise an adjustment of the said reduction by varying, in particular, the relatively small quantity of short-term antioxidant agent employed in bringing into contact with the polyethylene before its complete melting. In particular, the amplitude of the reduction in tg δ generally varies inversely with the quantity of short-term antioxidant agent which is employed. Thus, if it is desired in the process to increase the amplitude of the reduction in tg δ of the polyethylene at the end of treatment, it is possible, for example, to decrease the quantity of short-term antioxidant agent and even to go so far as to eliminate its use, that is to say not to bring any short-term antioxidant agent into contact with the polyethylene before its complete melting, or else to bring into action one or more of the other means described above to increase the amplitude of the reduction in tg δ, or else to combine two or more of all these means. If, on the contrary, it is desired to decrease the amplitude of the reduction in tg δ within the desired proportions, the reverse action may be taken, that is to say to increase the quantity of short-term antioxidant agent, or else to bring into action one or more of the other means described above to decrease the amplitude of the reduction in tg δ, or else to combine two or more of all these means.

However, it has been observed that good results are obtained when, before its complete melting, the polyethylene is not brought into contact in the extruder with any short-term antioxidant agent such as a phosphite or phosphonite.

The best results, especially where the bubble stability of the polymer in blown extrusion or film extrusion is concerned, are obtained when the gas mixture brought into contact with the polymer before its complete melting contains from 3 to 9% by volume of oxygen preferably measured in the gas atmosphere of a feed hopper of the extruder, the extruder supplies a specific mechanical energy of 0.20 to 0.35 kWh per kilogram of polyethylene and when the treatment is conducted to its completion when the value of tg δ has lost from 35 to 60% of its initial value. In this case it is preferred that no short-term antioxidant agent such as a phosphite or phosphonite be brought into contact with the polyethylene before the complete melting of the latter. The polymer temperature at the die may be especially from 230° to 250° C.

It has additionally been noted that the absence or a reduced quantity of short-term antioxidant agent may, in some cases, produce some yellowing of the processed polyethylene. In order to correct this defect it is then preferred to carry out the treatment of the polyethylene in the presence of zinc stearate. In this case, before its complete melting, the polyethylene may be advantageously brought into contact in the extruder with a quantity of zinc stearate ranging from 100 to 2000, preferably from 200 to 1500 ppm relative to the polyethylene. The zinc stearate may be introduced into the feed or melting zone of the extruder or preferably into the feed hopper of the extruder.

It has advantageously been observed that in the process of the invention a short-term antioxidant agent such as a phosphite or phosphonite can nevertheless be brought into contact with the polyethylene when the latter is already in the molten state, that is to say after its complete melting and before it leaves the extruder. In this case the short-term antioxidant agent may be introduced into the pumping or melt-conveying zone of the extruder, especially into the second half of this zone, situated near the extruder exit, in particular near the die. The quantity of short-term antioxidant agent may in this case be from 50 to 2000, preferably from 200 to 1500 ppm relative to the polyethylene.

The treatment may, furthermore, be carried out in the presence of long-term antioxidant agent, such as hindered phenols, and of other additives or fillers usually employed, such as slip agents, antiblocking agents, antistatic agents, bonding agents and pigments.

It has advantageously noticed that in the process of the invention, the weight-average molecular mass, the melt index, the molecular mass distribution and the density of the polyethylene do not substantially change.

EXAMPLES

The following nonlimiting examples illustrate the present invention.

Example 1

A homopolyethylene in the form of a powder consisting of porous particles is employed, manufactured by a gas phase polymerization process in a fluidized bed in the presence of a catalyst based on chromium oxide (1% by weight of chromium), modified with aluminium (2% by weight of aluminium), supported on silica and activated by a heat treatment at 500° C., and in the presence of triethylaluminium. The homopolyethylene, sold by BP Chemicals under reference "HD 5301"®, has the following characteristics:

density: 0.950±0.003 g/cm$^3$ $MI_{21.6}$ (ASTM-D-1238, condition F) : 8 g/10 minutes $MI_{8.5}$ (melt index measured at 190° C. under an 8.5 kg load) : 0.9 g/10 minutes Mw/Mn (by GPC): 15 loss tangent (tg δ)
  (1): 1.90 unsaturations of vinyl, vinylidene and vinylene type per 100 carbon atoms: 0.09 mass-average particle diameter: 1200 μm bulk density: 0.37 g/cm$^3$ pore volume of the particles: 0.12 cm$^3$/g specific surface (BET) : 0.3 m$^2$/g (1) measured by dynamic rheometry at 190° C. at a frequency of 1.5 10$^{-2}$ radians per second, with the aid of the mechanical and dynamic spectrometer sold by Rheometrics under reference "RMS 800/RDS II"®.

The homopolyethylene, stored under an ambient air atmosphere, is introduced into the feed hopper of a twin corotative screw extruder sold by Japan Steel Work under reference "CMP 65 X"® which has a die with 30 holes, each hole having a diameter of 3 mm.

Various of the additives employed in Examples 1 to 3 are shown in Table 1. The mixture of additives is added to the polyethylene in the feed hopper.

Furthermore, a nitrogen entry line provided with a stopcock reaches the feed hopper of the extruder and emerges by virtue of a diffuser in the lower part of the hopper, facing the entry of the feed zone and of the twin screw of the extruder. The stopcock allows the nitrogen flow rate to be adjusted at will. A sensor of a conductometric analyser is situated inside and in the lower part of the hopper so as to give a value of the percentage of oxygen present in the atmosphere in the hopper.

Table 2 shows, for each test:
  the mixture of additives employed;
  the pelletization conditions, especially the percentage by volume of oxygen in the gas mixture prevailing in the atmosphere of the feed hopper, the polymer temperature at the die, the specific mechanical energy (supplied by the extruder per kilogram of polymer), the reduction (% Δ tg δ) in the value of the loss tangent (tg δ) of the pelletized polymer, expressed as a percentage in relation to the initial value of tg δ of the polymer;
  the results obtained, especially a bubble stability index during the conversion of the polymer into film by blown extrusion (marked using a number ranging from 0 to 5, 5 being the maximum value corresponding to an outstanding stability and 0 the minimum value corresponding to a very poor stability), the loss tangent (tg δ) of the polymer after pelletization, measured under the same conditions as above, the polymer swelling ratio (SR) after pelletization, measured at the die exit of the apparatus measuring $MI_{21.6}$ according to ASTM standard D-1238 condition F, and a whiteness index (WI), measured according to ASTM-E-313.

TABLE 1

Mixtures of the additives employed in Examples 1 to 3

| Mixtures of additives | Ca stearate | ZN stearate | Irganox 1010 | Irganox 1076 | Irgafos 168 | Irgafos PEPQ |
|---|---|---|---|---|---|---|
| A | 0.1% | — | 0.1% | 0.1% | — | — |
| B | 0.1% | — | 0.1% | 0.1% | 0.1% | — |
| C | 0.1% | 0.1% | 0.1% | 0.1% | — | — |
| D | 0.1% | 0.1% | 0.1% | — | — | 0.1% |

"Irganox 1010" ®: long-term antioxidant, sold by Ciba-Geigy
"Irganox 1076" ®: long-term antioxidant, sold by Ciba-Geigy
"Irgafos 168" ®: short-term antioxidant, sold by Ciba-Geigy
"Irgafos PEPQ" ®: short-term antioxidant, sold by Ciba-Geigy.

TABLE 2

Tests of Example 1

| Test No. | Mixture of additives | $O_2$ % (vol.) | T °C. at the die | Specific mechanical energy (kWh/kg) | % Δ tg δ | Bubble stability index | tg δ | SR | WI |
|---|---|---|---|---|---|---|---|---|---|
| 1 | A | 3 | 198 | 0.176 | 21% | 2.0 | 1.49 | 1.36 | 38 |
| 2 | A | 3 | 244 | 0.227 | 38% | 3.0 | 1.17 | 1.35 | 35 |
| 3 | A | 21 | 245 | 0.223 | 53% | 4.5 | 0.90 | 1.51 | 30 |
| 4 | A | 7 | 243 | 0.226 | 42% | 3.5 | 1.10 | 1.35 | 28 |
| 5 | B | 3 | 196 | 0.180 | 1% | 1.5 | 1.88 | 1.36 | 52 |

Analysis of the results of Table 1 shows that:

test No. 5 is a test in which the polymer is treated with oxygen, a relatively low specific mechanical energy and in the presence of a short-term antioxidant; the thermomechanical treatment has resulted in a very small reduction (% Δ tg δ) of tg δ of the polymer; the bubble stability index corresponds to a relatively mediocre bubble stability;

test No. 1 is a test in which the polymer is treated with oxygen and a relatively low specific mechanical energy, but in the absence of short-term antioxidant; the treatment has resulted in a relatively high reduction (% Δ tg δ) in tg δ of the polymer; an improvement in bubble stability is noted when compared with test No. 5.

tests No. 2 and 4 are tests in which the quantity of oxygen changes from 3 to 7% respectively, the polymer being moreover treated with a relatively high specific mechanical energy and in the absence of short-term antioxidant; the treatment has resulted in a high reduction (% Δ tg δ) in tg δ of the polymer; a clear improvement in bubble stability is noted when compared with tests No. 1 and 5, as well as an improvement in test No. 4 when compared with test No. 2 because of the increase in the quantity of oxygen;

test No. 3 is a test in which the oxygen is at 21% and the polymer is treated with a relatively high specific mechanical energy, in the absence of short-term antioxidant; the treatment has resulted in a high reduction (% Δ tg δ) in tg δ of the polymer; the bubble stability is practically perfect.

Example 2

The operation is exactly as in Example 1, except for the fact that a twin-screw extruder sold by Werner-Pfleiderer under trade reference "ZSK 160"® is employed.

Table 3 shows the mixtures of additives employed, the treatment conditions and the results obtained.

TABLE 3

Tests of Example 2

| Test | Mixture of additives | $O_2$ % (vol.) | T °C. at the die | Specific mechanical energy (kWh/kg) | % Δ tg δ | Bubble stability index | tg δ | SR | WI No. |
|---|---|---|---|---|---|---|---|---|---|
| 6 | C | 8 | 240 | 0.27 | 47% | 5.0 | 1.00 | 1.67 | 60 |
| 7 | D | 8 | 240 | 0.27 | 5% | 1.5 | 1.80 | 1.35 | 76 |

Analysis of the results of Table 3 shows that:

test No. 6 is an outstanding test in which the polymer is treated with oxygen with a relatively high specific mechanical energy, in the absence of short-term antioxidant; the treatment is conducted to its completion with a high reduction (% Δ tg δ) in tg δ of the polymer; the bubble stability is perfect; the whiteness index is superior to those of the tests of Example 1 by virtue of the use of zinc stearate as additive when the polymer is treated;

test No. 7 is close to test No. 6, except for the presence of a short-term antioxidant and the treatment being conducted with a very small reduction (% Δ tg δ) in tg δ of the polymer.

Example 3

The operation is exactly as in Example 1, except for the fact that different polymer and different extruder are employed.

The polymer is a copolymer of ethylene and 1-butene in the form of a powder consisting of porous particles, manufactured by the same process as the homopolyethylene of Example 1. Sold by BP Chemicals under the reference "MD 3802"®, it has the following characteristics:

density: 0.938 g/cm$^3$ $MI_{21.6}$: 16 g/10 minutes $MI_{8.5.2}$ g/10 minutes

Mw/Mn (by GPC): 10 loss tangent (tg δ)

(1): 1.88 unsaturations of vinyl, vinylidene and vinylene type per 100 carbon atoms: 0.08 mass-average particle diameter: 1100 μm bulk density: 0.35 g/cm' pore volume of the particles: 0.11 cm$^3$/g specific surface (BET): 0.2 m$^2$/g (1) Measured by dynamic rheometry at 190° C. at a frequency of 1.5 10$^{-2}$ radians per second, with the aid of the mechanical and dynamic spectrometer sold by Rheometrics under reference "RMS 800/RDS II"®.

The copolymer, stored under an ambient air atmosphere, is introduced into the feed hopper of a twin corotative screw extruder sold by APV Baker Limited under reference "MP 2065"®. The feed hopper has a nitrogen feed line and a means for oxygen analysis as in Example 1.

Table 4 shows the mixtures of additives employed, the treatment conditions and the results obtained.

TABLE 4

Tests of Example 3

| | | Treatment conditions | | | Results | | | |
|---|---|---|---|---|---|---|---|---|
| Test | Mixture of additives | $O_2$ % (vol.) | T °C. at the die | Specific mechanical energy (kWh/kg) | % Δ tg δ | Bubble stability index | tg δ | SR | WI No. |
| 8 | C | 4 | 240 | 0.170 | 39% | 3.0 | 1.15 | 1.55 | 58 |
| 9 | D | 4 | 240 | 0.165 | 1% | 1.0 | 1.86 | 1.57 | 75 |

Analysis of the results of Table 4 shows that:

test No. 8 is a test in which the polymer is treated with oxygen and with a relatively low specific mechanical energy, in the absence of short-term antioxidant; the treatment is conducted to its completion with a relatively high reduction (% Δ tg δ) in tg δ of the polymer; the bubble stability is satisfactory;

test No. 9 is a test resembling test No. 8, except for the fact that the polymer contains a short-term antioxidant and that the treatment has been conducted with a very small reduction (% Δ tg δ) in tg δ of the polymer; bubble stability is poor.

I claim:

1. A process for improving the bubble stability of a linear polyethylene converted into film by blown extrusion, wherein a polyethylene having a density of 0.900 to 0.970, a molecular weight distribution such that the ratio of weight average molecular weight (Mw) to that based on the number average molecular weight (Mn) is from 8 to 40, and a value of the loss tangent measured by dynamic rheometry at 190° C. at a frequency of 1.5×10$^{-2}$ radians per second ranging from 1.5 to 3, wherein the polyethylene, before its complete melting in an extruder, is brought into contact with a gas mixture containing from 1 to 50% by volume of oxygen, thereafter treated thermomechanically in the molten state in an extruder supplying a specific mechanical energy of 0.15 to 0.5 kWh per kilogram of polyethylene, and completing the treatment when the value of the loss tangent of the polyethylene has lost from 15 to 70% of its initial value before any treatment.

2. A process according to claim 1, wherein the extruder is a twin-screw extruder.

3. A process according to claim 2 or 1, wherein before its complete melting, the polyethylene is brought into contact in the extruder with a quantity of short-term antioxidant agent of 1000 or less parts by weight per million (ppm) relative to the polyethylene.

4. A process according to claim 2 or 1, wherein before its complete melting, the polyethylene is not brought into contact in the extruder with any short-term antioxidant agent.

5. A process according to claim 2 or 1, wherein, after its complete melting and before it leaves the extruder, the polyethylene in the molten state is brought into contact with a short-term antioxidant agent.

6. A process according to claim 3, wherein the short-term antioxidant agent is chosen from phosphites and phosphonites.

7. A process according to claim 1, wherein, before its complete melting, the polyethylene is brought into contact in the extruder with a quantity of zinc stearate ranging from 100 to 2000 relative to the polyethylene.

8. A process according to claim 1, wherein the bringing into contact of the polyethylene with oxygen or the gas mixture containing oxygen is produced in a feed hopper of the extruder.

9. A process according to claim 1, wherein the bringing into contact of the polyethylene with oxygen or the gas mixture containing oxygen is produced in a feed or melting zone of the extruder.

10. A process according to claim 1, wherein the polyethylene contains from 0.05 to 0.2 of vinyl, vinylidene and vinylene unsaturations per 100 carbon atoms.

11. A process according to claim 1, wherein the polyethylene is prepared in a gas phase polymerization process, with the aid of a catalyst based on chromium oxide activated by a heat treatment.

12. A process according to claim 1, wherein the polyethylene is in the form of a powder consisting of porous particles which have a bulk density of 0.3 to 0.55 g/cm$^3$.

13. A process according to claim 1, wherein the polyethylene has a density of from 0.932 to 0.965 g/cm$^3$, a molecular weight distribution of Mw to Mn of 9 to 30 and its said loss tangent value ranges from 1.6 to 2.5.

14. A process according to claim 1 or 13, wherein said treatment is completed when the value of the loss tangent of the polyethylene has lost from 20 to 65% of its initial value.

15. A process according to claim 1 or 13, wherein the gas mixture contains from 2 to 21% by volume of oxygen.

16. A process according to claim 1 or 13, wherein the gas mixture contains from 3 to 14% by volume of oxygen.

17. A process according to claim 3, wherein the quantity of short-term antioxidant agent is from 0 to 500 ppm relative to the polyethylene.

18. A process according to claim 3, wherein the quantity of short-term antioxidant is from 0 to 200 ppm relative to the polyethylene.

19. A process according to claim 7, wherein said quantity of zinc stearate ranged from 200 to 1500 ppm relative to the polyethylene.

20. A process according to claim 12, wherein said porous particles have a bulk density of from 0.35 to 0.5 g/cm$^3$.

21. A process as defined in claim 1 wherein the specific mechanical energy supplied is from 0.20 to 0.35 kWh per kilogram of polyethylene.

* * * * *